UNITED STATES PATENT OFFICE.

CARL OLOF LUNDHOLM AND JOSEPH SAYERS, OF STEVENSTON, SCOTLAND

MANUFACTURE OF EXPLOSIVES.

SPECIFICATION forming part of Letters Patent No. 438,816, dated October 21, 1890.

Application filed May 20, 1890. Serial No. 352,513. (No specimens.) Patented in England June 26, 1889, No. 10,376, and in Belgium February 10, 1890, No. 89,466.

*To all whom it may concern:*

Be it known that we, CARL OLOF LUNDHOLM and JOSEPH SAYERS, subjects of the Queen of Great Britain and Ireland, and residents of Stevenston, in the county of Ayr, Scotland, have invented certain new and useful Improvements in the Manufacture of Explosives, (for which a British patent has been granted June 26, 1889, No. 10,376, and a Belgian patent granted February 10, 1890, No. 89,466,) of which the following is a specification.

Our said invention has principally for its object an improved mode of combining with nitro-glycerine large proportions of any suitable one (or more) of the nitro derivatives of cellulose, such as a nitro-cellulose, a nitro-oxycellulose, or a nitro-hydrocellulose. The invention is, however, also applicable for combining such substances in any proportions.

As the volume of the cellulose nitro derivatives is always large as compared with that of the nitro-glycerine, the requisite, thorough, uniform, and intimate intermixture of the ingredients presents difficulties which it is the object of our improved process to overcome in order that the finishing of the compounds may be facilitated and that the products may be free from imperfections. The mere mixing or stirring together of the ingredients in an ordinary manner is quite impracticable when the proportion of the cellulose nitro derivatives is large. Equal quantities of nitro-cellulose and nitro-glycerine have been mixed in an ordinary way, and by subsequent pressure it has been attempted to distribute the nitro-glycerine in a uniform manner, but the products obtained in that way have not been satisfactory. It is scarcely possible by ordinary mixing operations to usefully combine any nitro-cellulose with less than an equal weight of nitro-glycerine. By our improved process, however, any proportions of the cellulose nitro derivatives and the nitro-glycerine can be uniformly mixed. In our process we avail ourselves of the fact which we have discovered that the cellulose nitro derivatives have the property of taking up or absorbing the nitro-glycerine when suspended in water or other suitable liquid.

According to one modification we take a suitable cellulose nitro derivative, preferably in a state of fine division, and made into a pulp with water which is cold or more or less heated. We mix the nitro-glycerine with water which is cold or more less heated, and we next incorporate very thoroughly the mixture with the pulp by pouring one into the other and at the same time maintaining a vigorous agitation in the mixing-vessel. According to other modifications we may diffuse or mix only one of the substances with water, afterward gradually adding the other with vigorous agitation; or we take both substances without previous admixture with water and bring them into a suitable quantity of water and subject them to vigorous agitation therein until we get a homogeneous mixture. If, for example, the explosive compound to be formed is to consist of nitro-oxycellulose and nitro-glycerine, we take the nitro-oxycellulose, preferably in a state of fine division, and suspend it in water kept agitated with air or by mechanical stirring, or otherwise. We introduce the nitro-glycerine in the form of a fine jet or as spray into the agitated water, with the result that the nitro-glycerine is taken up in a uniform manner by the nitro-oxycellulose suspended in the water. The water is next strained off and leaves the whole of the nitro-glycerine, which cannot be separated even by the application of considerable pressure.

In place of water any convenient solution or liquid may be used in which to suspend the cellulose nitro derivative, which will not dissolve or act chemically on the cellulose nitro derivative or nitro-glycerine employed.

In order to finish the explosive compounds obtained by the hereinbefore-described mixing process, the liquid may be separated by straining or otherwise, followed by pressure or by subjection to centrifugal apparatus. The compound, with or without further drying, is malaxated between rollers, preferably heated, or it is pressed or subjected to the combined action of pressure and heat. The compound may next be molded or rolled into blocks, or into plain or corrugated sheets, or into strips or rods. For propelling purposes the explosive compounds may be finally formed into variously-sized cubic or other forms, pellets, grains, threads, tubes, or plain or corrugated strips, any of such forms being easily producible by known mechanical appliances.

What we claim as our invention is—

The process for mixing or incorporating together cellulose nitro derivatives with nitroglycerine, the said process consisting in suspending or diffusing the ingredients in a liquid, such as water, which is or has been rendered practically incapable of dissolving them, agitating them together in the liquid, and subsequently separating the liquid, all substantially as hereinbefore described.

In testimony whereof we have signed our names to this specification in the presence of two subscribing witnesses.

CARL OLOF LUNDHOLM.
JOSEPH SAYERS.

Witnesses:
EDMUND HUNT,
DAVID FERGUSON.